Patented July 26, 1932

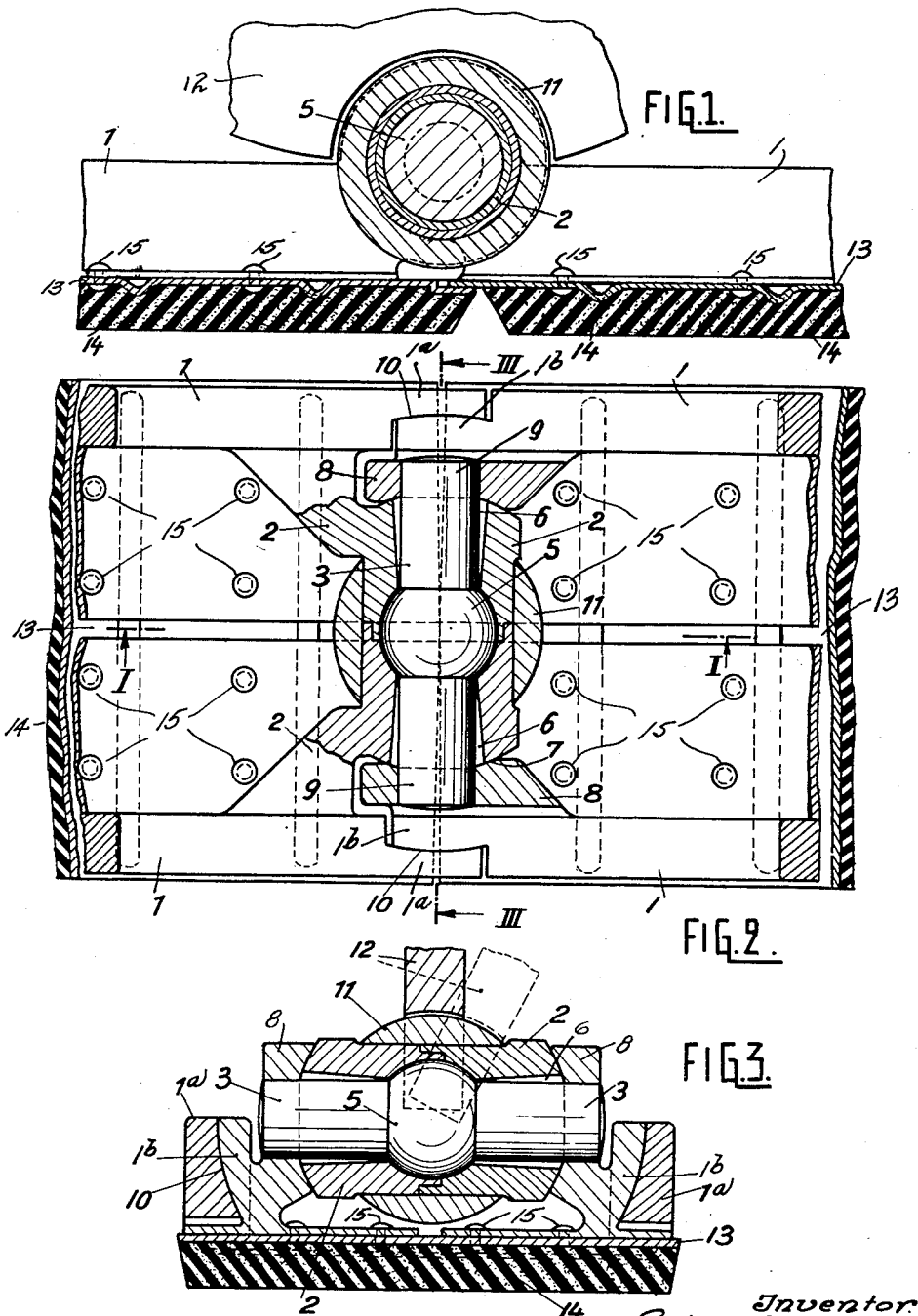

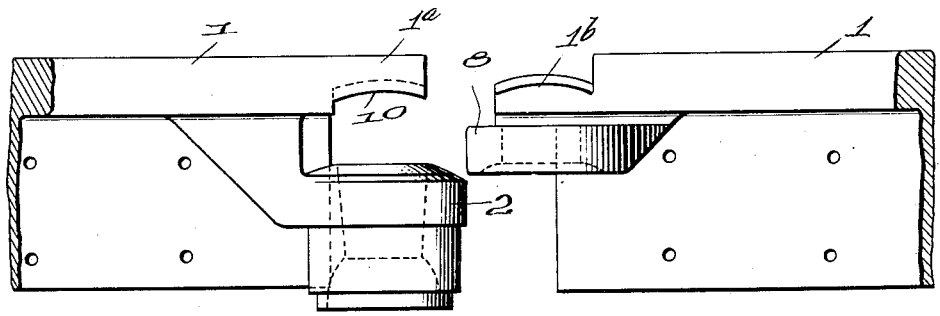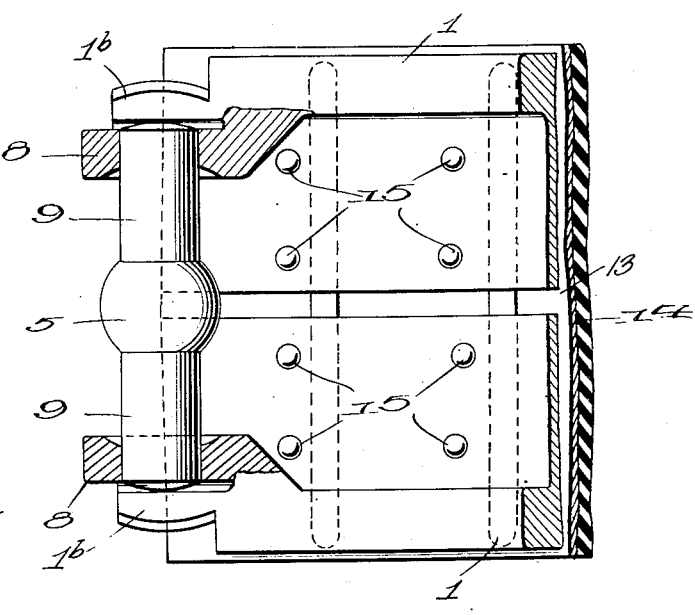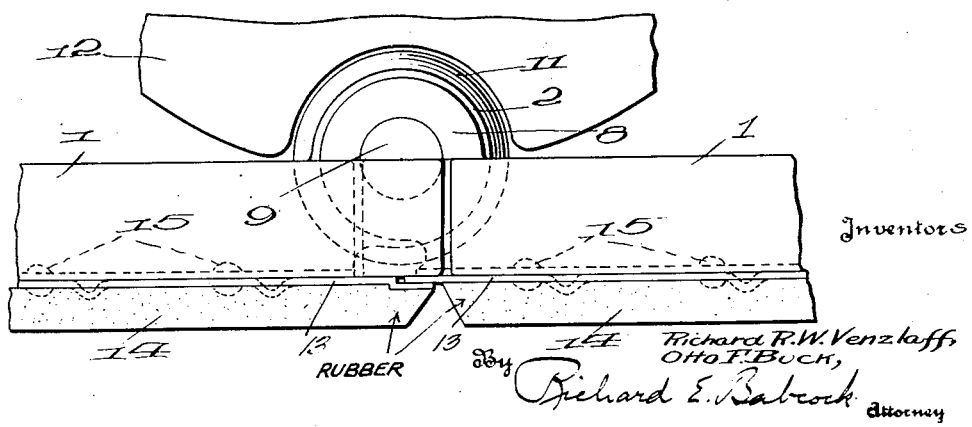

1,869,290

UNITED STATES PATENT OFFICE

RICHARD R. W. VENZLAFF AND OTTO F. BUCK, OF BERLIN, GERMANY

ENDLESS TRACTION BELT

Application filed January 16, 1929, Serial No. 332,975, and in Germany January 21, 1928.

This invention relates to endless traction belts such as are employed as the traction means for endless belt tractors and vehicles, and particularly to the joints or means for pivotally connecting the links of such belts.

It has for its objects to provide a joint which, while allowing universal movement, is very rugged, easily assembled, of few parts, and capable of quick repair or replacement with ease and accuracy without need for an exceptional degree of skill; to provide a special construction of pivot pin in combination with a special socket bearing therefor whereby said socket bearing maintains the pivot pin in proper position against axial relative movement without need of other securement means for said pin; and to provide such a joint so formed as to exclude dust and foreign matter to an exceptional degree.

The invention will be more fully described by reference to the accompanying drawings showing an embodiment of the principles thereof by way of example. Figure 1 of the drawings is a longitudinal section on the line I—I of Figure 2, showing the connection of the adjacent ends of two chain members. Figure 2 is a plan view of the connecting point with parts in horizontal section. Figure 3 is a sectional view on the line III—III of Figure 2. Figure 4 is a fragmentary detail top plan view of one end portion of one of the members 1 with its integral bearing member or eye 2 integral with said end portion, Figure 5 is a similar view of the other end portion of one of the members 1 with its integral bearing member or eye 8 integral with said end portion, Figure 6 is a fragmentary detail top plan view of one of the plates 13 with a cooperating pair of running rails 1 secured thereto and with the pin 3 having its end portions disposed in the respective eyes or bearings 8 integral with the corresponding end portions of the respective running rails 1, and Figure 7 is a side elevation of the joint with the respective plates 13, treads 14 and the pair of running rails 1 broken away.

The ball joint for the connection of the adjacent ends of the chain members comprises the pivoting stud or link-bolt 9 with spherical central portion 5 and with the bearing eyes 2 and 8 of the adjacent lapping end portions of the respective pairs of rails 1 of two adjacent chain members surrounding the bolt 9. The bearing eyes 2 of one pair of the members 1 of one chain member or link encompass the spherical portion 5 of the bolt or pivoting stud 9 and are divided in the vertical longitudinal plane in order that the two portions of the bearing may be slipped onto the bolt in the axial direction thereof. The holes 6 of the bearings which branch off from the hollow spherical portions of the bearing eyes are conically flared outwardly of the cylindrical portion of the bolt 9, in order to allow of sufficient play for the movement of the members.

The bearing eyes 8 of the adjacent overlapping end portion of the pair of rails 1 of the next adjacent chain member or link tightly surround the ends of the bolt 9 journalled therein, and they also engagingly surround the end surfaces 7 of the bearing eyes 2 which are spherically shaped around the rotating center, so as to present a dust-proof ball joint around this center.

One bearing eye 2 and one extension 1ª are formed integral with one end portion of each running rail 1, and one bearing eye 8 and one extension 1ᵇ are formed integral with the other end portion of each said running rail 1, and said running rails 1 are arranged in pairs, the rails 1 of each pair being rigidly connected to their corresponding plate 13 by rivets 15 with the bearing eyes 2 presented toward, and in transverse registry with, each other and with the bearing eyes 8 similarly presented toward, and in transverse registry with each other.

The inner opposed faces of each pair of extensions 1ª are disposed in the plane of connection of that end of the particular pair of rails 1 of that particular chain or like member and receive between them the interlapped pair of extensions 1ᵇ of the adjacent end portion of the duplicate pair of rails 1 of the next adjacent chain or link member, and the respective opposing engaging faces 10 of said extensions 1ª and 1ᵇ are spherically formed and concentrically disposed with relation to the rotating center of the joint as a unit.

These plates 13 are preferably connected with the rubber treads or plates 14 by being vulcanized thereto or in any other usual and suitable well known manner. Said plates or treads will be ordinary rubber treads or blocks such as now well known and employed for this purpose. Upon the central bearing eyes 2 a collar or sleeve 11 is rotatably mounted, the outer surface of which is spherically shaped with a view of obtaining a good operative engagement of the driving wheel 12 even in the case of an angular position thereof with relation to the chain member, as indicated in dotted lines in Fig. 3.

Inasmuch as in the device of this invention only the bearing eyes of the chain members and of the pivoting studs are employed which, in accordance with the strains and stresses to which the device is intended to be exposed, are correspondingly strong and heavy, the new ball-joint-connection presents the advantage of an extraordinarily high degree of safety of operation and of simplicity in the process of manufacture combined with a very high degree of adaptability to the irregularities and unevenness of the road.

While we have described the principles of arrangement and operation of the device according to our invention with reference to what we now consider to represent the best embodiment thereof, we desire it to be understood that the embodiment shown is only illustrative and that the invention is capable of modifications and changes within the spirit and scope of the appended claims.

We claim:—

1. In a device of the character described, the combination with two link-members, a transversely disposed pivoting stud in one member, and a substantially centrally disposed spherical portion on said stud, of correspondingly hollowed protruding bearing means on the other member and surrounding the stud, bearing means on the first mentioned member surrounding the end portions of the stud, said hollowed protruding bearing means having a central spherical surface engaging said spherical portion, and spherical end surfaces engaging spherical surfaces on the bearing means on the first mentioned member.

2. In a device of the kind described, the combination with two link-members, and a transversely disposed pivoting stud in one member, said stud being formed with an integral central spherical portion, of stud-engaging means on said member around the terminal parts of said stud, a complemental, interiorly spherically hollowed bearing member on the other link-member intermediate the terminal stud-engaging means, tread-portions on the link members, and means to secure the tread-portions to the stud-engaging and bearing members.

3. In a device of the character described, the combination with two link-members, of pivoting means transversely mounted in one of said members, a spherical portion on said pivoting means intermediate its ends, a complemental, internally correspondingly hollowed bearing on the other link member surrounding the spherical portion and bisectionally divided in the longitudinal direction of the link-members, an outwardly flaring, internal tubular portion at opposite ends of the complemental bearing, surrounding part of the pivoting means, additional bearing means surrounding the terminal portions of the pivoting means, and substantially spherically shaped engaging portions respectively disposed on the additional bearing means and on the complemental bearing.

4. In a device of the character described, the combination with two link-members having tread members of pivoting means transversely mounted in one of said link members, a spherical portion on said pivoting means, and spherical internally hollowed bearing means on the other link member engaging the pivoting means, longitudinally extending bars on the tread members connected to the bearing means, and lengthwise projecting, curved, spherical engaging means at the ends of said bars.

5. In a device of the character described, the combination with two link-members, of pivoting means transversely disposed in one of said members, a spherical portion on said pivoting means intermediate its ends, spherical, internally hollowed bearing means on the other link member engaging the pivoting means and around the same and having internal, endwise outwardly flaring tubular portions on opposite sides of the bearing means and surrounding the pivoting means, and a cylindrically bored sleeve fitting about said bearing means and formed with a spherical outer face.

6. In a device of the kind described, two link members, a pair of end bearings connected with one member, a pivot-pin having its end portions disposed in said bearings and centrally formed with an integral ball portion, in combination with a pair of socket bearings connected to said other member and fitting about said ball between said end bearings and having complementary inner faces together conforming to said ball and together comprising a radially split composite socket bearing fitting about said ball and preventing axial displacement of said pivot-pin.

7. In an endless belt, a plurality of links pivotally connected for universal movement, a pair of rails provided on each link, said rails being formed at one end of the link with outwardly presented convex faces and at the other end of said link with inwardly presented concave faces, the convex faces of the rails of each link being disposed between and engaging the concave faces of the adjacent end portions of the rails of the next adjacent link.

In testimony whereof, we have signed our names to this specification at Berlin this 18th day of December, 1928.

RICHARD R. W. VENZLAFF.
OTTO F. BUCK.